United States Patent [19]

Repetto

[11] 4,173,904

[45] Nov. 13, 1979

[54] APPARATUS FOR AUTOMATICALLY CENTERING AN ENDLESS BAND TRAINED OVER TWO ROLLS

[75] Inventor: Silvio Repetto, Modena, Italy

[73] Assignee: S.p.A. Luigi Rizzi & C., Modena, Italy

[21] Appl. No.: 841,752

[22] Filed: Oct. 13, 1977

Related U.S. Application Data

[63] Continuation-in-part of Ser. No. 714,754, Aug. 16, 1976, abandoned.

[30] Foreign Application Priority Data

Sep. 3, 1975 [IT] Italy .................... 26875 A/75
Dec. 2, 1975 [IT] Italy .................... 29920 A/75

[51] Int. Cl.² .................... F16H 7/18; B65H 25/26
[52] U.S. Cl. .................... 74/241; 226/21; 198/807
[58] Field of Search .................... 74/241; 226/18, 19, 226/20, 21, 22, 23; 198/806, 807; 162/257

[56] References Cited

U.S. PATENT DOCUMENTS

| | | | |
|---|---|---|---|
| 1,178,602 | 4/1916 | Smith | 74/241 |
| 2,431,557 | 11/1947 | Hornbostel | 74/241 |
| 2,484,473 | 10/1949 | Staege | 74/241 |
| 2,709,588 | 5/1955 | Staege | 74/241 |
| 2,914,957 | 12/1959 | Johnson | 74/241 |
| 3,043,153 | 7/1962 | Hindle et al. | 74/241 |
| 3,117,462 | 1/1964 | Davis | 74/241 |
| 3,118,314 | 1/1964 | Schuster | 74/241 |
| 3,119,535 | 1/1964 | Hoffman | 74/241 |
| 3,254,818 | 6/1966 | Jacobsen | 226/21 |
| 3,300,114 | 1/1967 | Jacobsen | 226/21 |
| 3,452,908 | 7/1969 | Hindle et al. | 74/241 |
| 3,545,599 | 12/1970 | Smith | 74/241 |
| 3,770,108 | 11/1973 | Ettel | 198/807 |
| 4,051,742 | 10/1977 | Johansson et al. | 74/241 |

FOREIGN PATENT DOCUMENTS 549133 7/1956 Belgium .
2407842 8/1975 Fed. Rep. of Germany ............ 226/21

*Primary Examiner*—Samuel Scott
*Assistant Examiner*—William R. Henderson
*Attorney, Agent, or Firm*—Kurt Kelman

[57] ABSTRACT

In an apparatus wherein an endless band is trained over a stationary guide roll and a stretching roll, and a nut-and-spindle mechanism at the ends of the stretching roll can displace the stretching roll in a plane defined by the axes of the rolls when the band is centered on the rolls, the band is automatically centered by two hydraulic double-acting cylinder-piston units. The first unit displaces either end of the stretching roll in the plane and the second unit simultaneously displaces one end in a plane perpendicular thereto. This displacement is effected in response to a control signal from a sensor adjacent each side edge of the band and tripped when the side edge moves into contact therewith as the band moves out of its centered position. The control signal operates a three-way solenoid valve in a hydraulic control circuit for the cylinder-piston units.

4 Claims, 4 Drawing Figures

APPARATUS FOR AUTOMATICALLY CENTERING AN ENDLESS BAND TRAINED OVER TWO ROLLS

This is a continuation-in-part application of my copending application Ser. No. 714,754, filed Aug. 16, 1976 now abandoned.

The present invention relates to an apparatus for automatically centering an endless band trained over a stationary driven guide roll and a stretching roll. Each roll has two ends wherebetween the endless band is centered in a starting position, the rolls having axes defining a plane in the starting position, and the band having respective side edges adjacent respective ones of the roll ends.

Such endless bands are used in machines or presses for drying hides, for example, and considerable difficulties have been encountered in maintaining these bands centered on the rolls during operation, particularly since the bands are usually rather wide and thick, being of felt or like deformable material.

In drying wet hides, they are usually introduced between two superposed endless bands of felt, which are then pressed against each other to squeeze the hide therebetween. Under these operating conditions, each band is axially stressed by forces due to unavoidable variations in the thickness of the felt band and the processed hides.

It is a primary object of this invention to provide an improved apparatus for centering an endless band trained over two rolls in a manner to assure dependable, accurate and rapid centering of the band, regardless of the band material and/or the nature of the hides squeezed dry between such bands.

The above and other objects are accomplished in accordance with the invention, wherein a nut-and-spindle mechanism is connected at each end of the stretching roll and the nut of each mechanism is mounted on the roll end and the spindle of each mechanism is in threaded rotatable engagement with the nut but axially stationary whereby rotation of the spindle displaces the end in the plane of the roll axes, by a centering apparatus comprising a first hydraulic means for displacing either end of the stretching roll in the plane, the first hydraulic means including a double-acting cylinder-piston unit at either end of the stretching roll and having a piston connected to a respective one of the spindles and a second hydraulic means for displacing one of the ends of the stretching roll substantially perpendicularly to the plane, the second hydraulic means including another double-acting cylinder-piston unit and a frame pivotally mounted for swinging in a plane substantially perpendicular to the first-named plane, the nut-and-spindle mechanism at the one end being slidably mounted in the frame, and the other cylinder-piston unit being connected to the frame for swinging the frame in the perpendicular plane. A sensor means is disposed adjacent each of the side edges of the endless band and spaced therefrom when the band is centered, a respective one of the sensor means producing a control signal when a respective one of the side edges moves into contact therewith when the endless band deviates from the centered position between the ends of the rolls, and a hydraulic fluid control circuit including a three-way solenoid valve delivers hydraulic pressure to the double-acting cylinder-piston units of the first and second hydraulic means. The valve is responsive to the control signal to deliver hydraulic pressure to the cylinder-piston units for simultaneously displacing the one end of the stretching roll in both planes until the endlss endless has resumed its centered position.

With this apparatus, a combined motion in mutually Perpendicular planes is imparted to one end of the stretching roll each time the endless band deviates from its position beyond a tolerable limit set by the sensor means and the band is automatically returned to its centered position by this motion. 21

The above and other objects, advantages and features of the present invention will be better understood from the following detailed description of a now preferred embodiment thereof, taken in conjunction with the accompanying drawing wherein.

Figure 1:
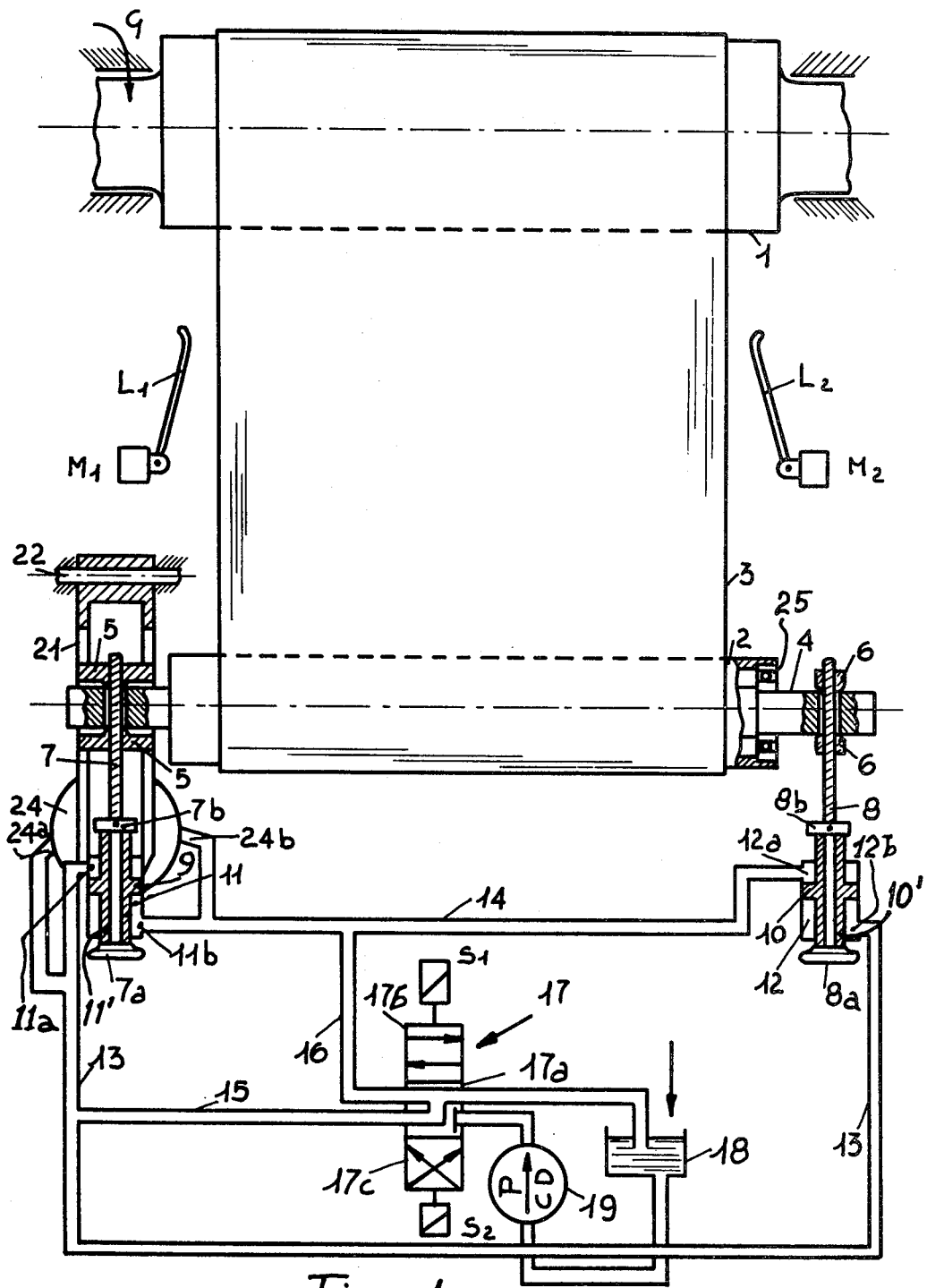
FIG. 1 is a diagrammatic top view of an endless band guide and centering apparatus in the starting or centered position of the band, portions of the apparatus being shown in cross section.

Referring now to the drawing and first to FIG. 1 showing the starting position, endless band 3, which may be a web of felt or the like, is guided or trained over driven guide roll 1 and stretching roll 2. The driven guide roll is mounted non-displaceably with respect to the stretching roll and its rotation continuously moved band 3 about the rolls. Such installations are found in machines or presses for drying hides or the like.

In the starting position illustrated in FIG. 1, when endless band 3 is centered on the rolls, the axes of rolls 1 and 2 define a plane and stretching roll 2 is displaceable in relation to driven guide roll 1 in this plane by means of nut-and-spindle mechanisms connected to the respective ends of support shaft 4 of stretching roll 2, the stretching roll being freely rotatably mounted on the support shaft by anti-friction bearings 25. Displacing stretching roll 2 away from guide roll 1 in the plane defined by the axes of the rolls will stretch endless band 3 trained thereover.

The illustrated stretching mechanisms comprise bearing nuts 5 and 6 in which respective ends of stretching roll support shaft 4 are mounted and threaded spindles 7 and 8 respectively engaged by bearing nuts 5 and 6, the spindles passing freely through bores in the shaft ends. Each spindle is affixed to a respective piston rod 11', 10' of a double-acting piston 11, 10, respectively, each piston rod being axially retained between handwheel 7a, 8a, respectively, for rotating the associated spindle and locking nut 7b, 8b, respectively. In this manner, spindles 7 and 8 are axially fixed and their rotation will cause meshing internal threads of bearing nuts 5 and 6 to displace support shaft 4 and stretching roll 2 in relation to guide roll 1.

At least one end of stretching roll 2 (the left end, in the illustrated embodiment) is mounted for displacement along circular arc A (see FIG. 2) about pivot 22 and in a plane substantially perpendicular to the first plane defined by the axes of rolls 1 and 2. In the illustrated embodiment, the means for effecting this displacement comprises support frame 21 mounted at one end on journal 22 which constitutes a fixed pivot axis parallel to the roll axes and lying in the first plane intermediate the roll axes. The support frame may be swung about journal 22 and carries bearing nut 5 for the one support shaft end, the bearing nut including a shoe 20 or like gliding element slidably received in support frame 21 to permit displacement of the bearing nut and the support shaft end carried thereby in a general direction towards and away from driven guide roll 1. The other or free end of support frame 21 is linked to piston rod 23 of a double-acting piston 26 which is glidably mounted in cylinder 24 defining ports 24a and 24b connected to the respective chambers of the cylinder. Operation of this hydraulic motor will swing support frame 21 and the support shaft end carried thereby about journal 22 along arcuate path A.

Figure 2:
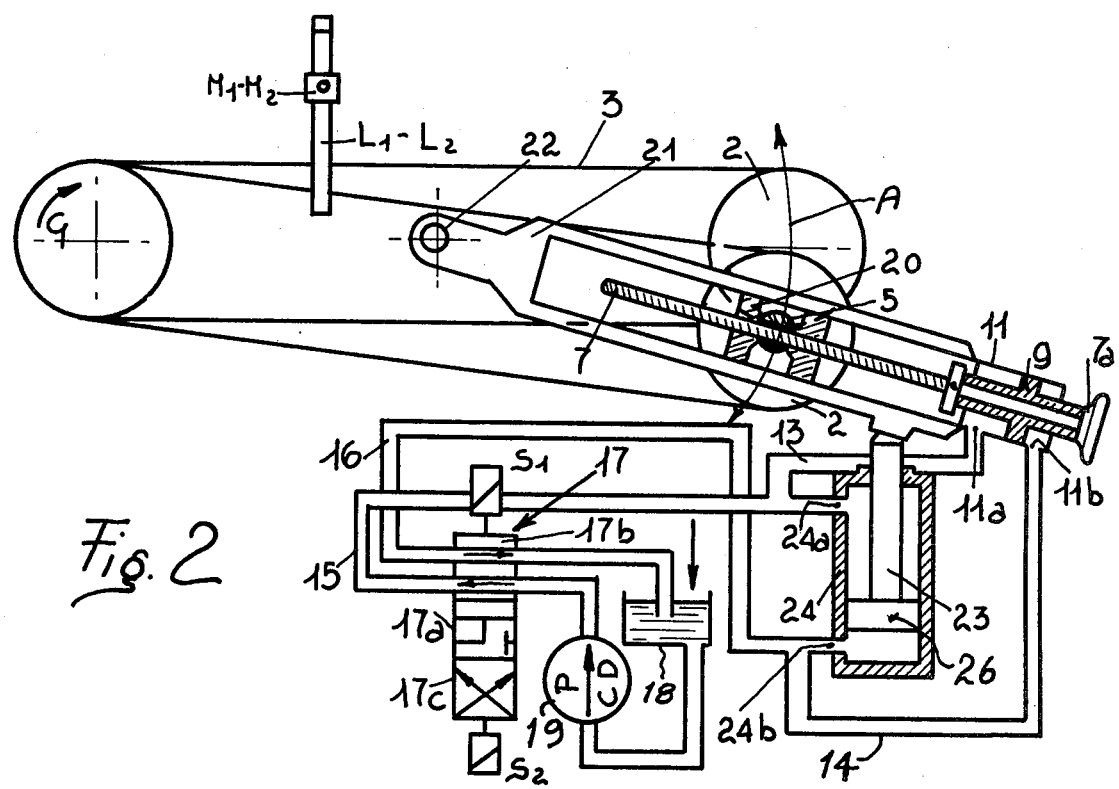
FIG. 2 is a like side elevational view of the apparatus, showing the stretching roll of the endless band downwardly displaced with respect to the starting position.
Figure 3:
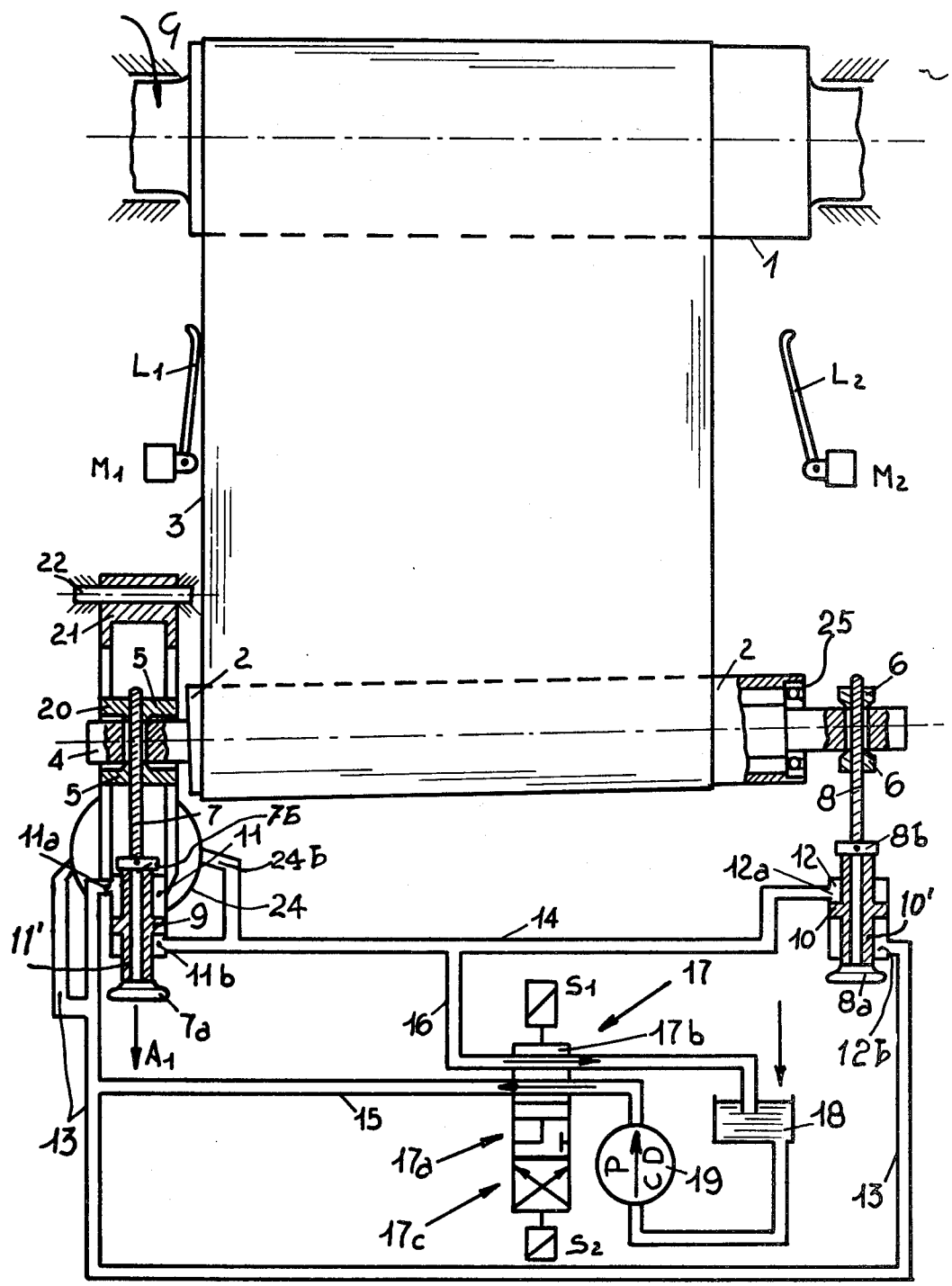
FIG. 3 is similar to FIG. 1 but shows the endless band displaced leftward on the rolls.

Cylinders 11 and 12, wherein double-acting pistons 9 and 10 are respectively glidably mounted, have respective ports 11a, 11b and 12a, 12b leading into the respective chambers of the cylinders. As the hydraulic fluid circuit diagrams in FIGS. 1, 2, and 3 show, hydraulic fluid conduit 13 is connected to port 11a of cylinder 11 and port 12b, and hydraulic fluid conduit 14 connects port 11b of cylinder 11 and port 12a of cylinder 12. In this manner, the opposite chambers of cylinders 11 and 12 are in communication, hydraulic fluid flow through these conduits causing pistons 9 and 10 glidably mounted in these cylinders to move in opposite directions, i.e. when one end of support shaft 4 is displaced by the connected piston in one direction, the other end of the support shaft will be displaced in the opposite direction. Hydraulic fluid conduits 13 and 14 also have branches 15 and 16 connecting the conduits, respectively, to port 24a and port 24b of cylinder 24. Branch conduits 15 and 16 are connected to three-way solenoid valve 17. The hydraulic fluid conduit is completed by hydraulic fluid sump 18 and fluid pump 19, the pump delivering hydraulic fluid from the sump to the solenoid valve for controlled distribution through the circuit in a manner to be described hereinafter and hydraulic fluid being returned from the valve to the sump.

Solenoid valve 17 has a central stage 17a and two additional stages 17b and 17c, one of the additional stages 17b having two parallel and oppositely directed passages and the other additional stage 17c having two intersecting passages. The operation of the solenoid valve is controlled by solenoids $S_1$ and $S_2$ to interconnect the valve passages in a selected manner for the desired distribution of the hydraulic fluid to operating cylinders 11, 12 and 24.

Sensor members $M_1$ and $M_2$, with their contact levers $L_1$ and $L_2$, are positioned adjacent respective longitudinal edges of endless band 3, the contact levers being spaced from the edges a distance corresponding to the admissible tolerance for lateral displacement of the band on the rolls. Electric conductors (not shown to avoid encumbering the drawing with obvious and unnecessary details) connect sensor member $M_1$ with solenoid $S_1$ and sensor member $M_2$ with solenoid $S_2$.

The above-described apparatus operates in the following manner:

The machine is initially pre-set, with the endless band accurately centered on driven roll 1 and stretching roll 2 and stretched to a desired extent by operating handwheels 7a and 8a until the roll 2 has been displaced away from roll 1 to a point at which endless band 3 is under a desired tension. Guide roll 1 is then driven by a suitable power source in the direction of arrow G, causing the freely rotatable roll 2 to be rotated in the same direction. In this starting position, the axes of the rolls and pivot axes 22 all lie in one plane, pistons 9 and 10 are in one end position closest to the bearing nuts for the support shaft ends (as shown in FIG. 1) and piston 23 is about midway of its stroke intermediate ports 24a and 24b, being retained in this position by spring or like conventional means (not shown). Solenoid valve 17 connects hydraulic fluid sump 18 to branch conduits 15 and 16 so that cylinders 11 and 12 are in communication with the sump. Pump 19 is disconnected from the operating cylinders so that the hydraulic circuit is inactive at this stage.

Figure 4:
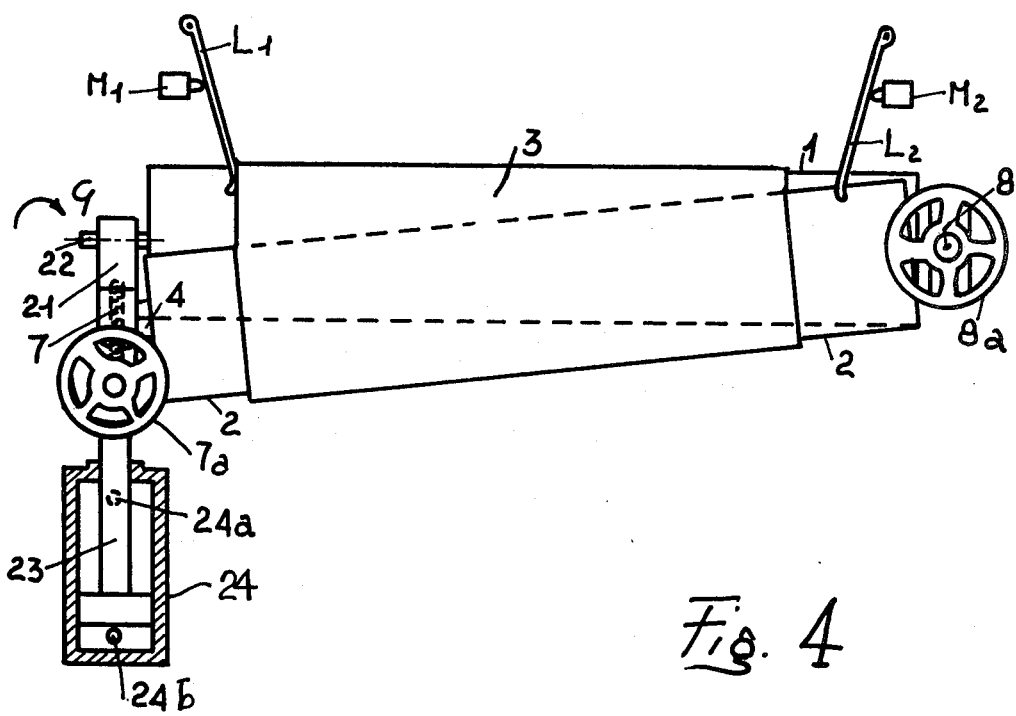
FIG. 4 is a front view of FIG. 3, showing one end of the stretching roller displaced downwardly.

As illustrated in FIGS. 2, 3 and 4, when endless band 3 deviates towards one side, i.e. to the left, as shown, beyond an admissible distance, the edge of the band engages contact lever $L_1$ of sensor member $M_1$, the latter producing a control signal transmitted to solenoid $S_1$ which is accordingly energized. The energized solenoid actuates valve 17, causing one of the passages of valve stage 17b to connect hydraulic fluid pump 19 to branch conduit 15 while the other passage of this valve stage connects branch conduit 16 to sump 18. In this manner, hydraulic fluid pressure is supplied through branch conduit 15 to conduit 13, delivering pressure through port 11a and port 12b into cylinder 11 and 12. This causes double-acting piston 9 to be driven in the direction of arrow $A_1$ (see FIG. 3) to displace the associated support shaft end away from guide roll 1 while double-acting piston 10 is simultaneously displaced the same distance in the opposite direction, thus tilting stretching roll 2 in the first plane. At the same time, since branch conduit 16 is connected to conduit 14, hydraulic fluid displaced by the movement of pistons 9 and 10 will flow out of ports 11b and 12a through conduit 14 and branch conduit 16 into sump 18. Furthermore, the pressure in conduit 13 simultaneously is applied through port 24a to the upper chamber of cylinder 24, driving double-acting piston 23 downwardly (see FIG. 2) to displace the associated support shaft end additionally downwardly out of the first plane along arcuate path A, thus tilting the stretching roll not only in the plane but also in a plane perpendicular thereto. The hydraulic fluid displaced by the movement of piston 23 will flow out of port 24b through conduit 14 and branch conduit 16 into sump 18.

This double-tilting motion of the left end of stretching roll 2 will cause endless band 3 to shift on the roll to the right, i.e. to the vertex of converging axes, and this shifting will continue until the left edge of the band is disengaged by contact lever $L_1$. This will cause solenoid $S_1$ to be deenergized and solenoid valve 17 to return to its starting position, in which the hydraulic control circuit is inactive.

Conversely, when a displacement of the endless band to the right triggers a control signal from sensor member $M_2$ to solenoid $S_2$, stage 17c of the valve will be operated to supply hydraulic pressure to conduit 14 and connect conduit 13 to the sump, thus reversing the directions of movements of the double-acting pistons to shift endless band 3 to the left. Thus, the disclosed mechanism will assure centering of the endless band under all operating conditions whatever the type of web material used for the endless band and even when the band exhibits slippage in relation to the stretching roll. The mechanism responds promptly to lateral displacements of the endless band on the stretching roll and assures high accuracy in centering the band thereon in a manner not attainable with two separate devices.

While it has been illustrated in association with the left end of the stretching roll, it may obviously be connected to either end without in any manner changing the structure or function of the apparatus.

What is claimed is:

1. An apparatus for automatically centering an endless band trained over a driven guide roll and a stretching roll, each roll having two ends wherebetween the endless band is centered in a starting position, the rolls having axes defining a plane in the starting position, the band having respective side edges adjacent respective ones of the roll ends, and including a nut-and-spindle mechanism at each end of the stretching roll, the nut of each mechanism being mounted on the roll end and the spindle of each mechanism being in threaded rotatable engagement with the nut but axially stationary whereby rotation of the spindle displaces the end in the plane, the centering apparatus comprising (a) a first hydraulic means for displacing either end of the stretching roll in the plane, the first hydraulic means including
  (1) a double-acting cylinder-piston unit at either end of the stretching roll and having a piston connected to a respective one of the spindles,
(b) a second hydraulic means for displacing one of the ends of the stretching roll substantially perpendicularly to the plane, the second hydraulic means including
  (1) another double-acting cylinder-piston unit and
  (2) a frame pivotally mounted for swinging in a plane substantially perpendicular to the first-named plane, the nut-and-spindle mechanism at the one end being slidably mounted in the frame, and the other cylinder-piston unit being connected to the frame for swinging the frame in the perpendicular plane,
(c) a sensor means disposed adjacent each of the side edges of the endless band and spaced therefrom when the band is centered, a respective one of the sensor means producing a control signal when a respective one of the side edges moves into contact therewith when the endless band deviates from the centered position between the ends of the rolls, and
(d) a hydraulic fluid control circuit including a three-way solenoid valve for delivering hydraulic pressure to the double-acting cylinder-piston units of the first and second hydraulic means, the valve being responsive to the control signal to deliver hydraulic pressure to the cylinder-piston units for simultaneously displacing the one end of the stretching roll in both planes until the endless band has resumed its centered position.

2. The apparatus of claim 1, wherein the hydraulic fluid control circuit comprises a hydraulic fluid sump and a hydraulic fluid pump, the solenoid valve being selectively connectible to the sump and pump, and the valve including two solenoids respectively responsive to a respective one of the sensor means for selectively connecting the cylinder-piston units to the sump and pump.

3. The apparatus of claim 1, wherein the nut of the nut-and-spindle mechanism at the one end is slidably mounted in the frame.

4. The apparatus of claim 1, further comprising a pivot axis intermediate the rolls and extending parallel to the axis of the driven guide roll for pivotally mounting the frame.

* * * * *